United States Patent
Kamran et al.

(10) Patent No.: US 11,494,236 B2
(45) Date of Patent: Nov. 8, 2022

(54) SYSTEM AND METHOD FOR SHARING CENTRAL PROCESSING UNIT (CPU) RESOURCES WITH UNBALANCED APPLICATIONS

(71) Applicant: EMC IP Holding Company, LLC, Hopkinton, MA (US)

(72) Inventors: Lior Kamran, Rishon LeZion (IL); Amitai Alkalay, Kadima (IL)

(73) Assignee: EMP IP Holding Company, LLC, Hopkinton, MA (US)

( * ) Notice: Subject to any disclaimer, the term of this patent is extended or adjusted under 35 U.S.C. 154(b) by 365 days.

(21) Appl. No.: 16/867,613

(22) Filed: May 6, 2020

(65) Prior Publication Data
US 2021/0349762 A1 Nov. 11, 2021

(51) Int. Cl.
*G06F 9/50* (2006.01)
*G06F 9/48* (2006.01)
*G06F 11/30* (2006.01)

(52) U.S. Cl.
CPC .......... *G06F 9/5027* (2013.01); *G06F 9/4881* (2013.01); *G06F 11/3024* (2013.01); *G06F 2209/5018* (2013.01)

(58) Field of Classification Search
None
See application file for complete search history.

(56) References Cited

U.S. PATENT DOCUMENTS

| | | | | |
|---|---|---|---|---|
| 6,230,200 B1 * | 5/2001 | Forecast | .................. | G06F 9/50 709/219 |
| 8,347,302 B1 * | 1/2013 | Vincent | ................. | G06F 9/5011 718/103 |
| 9,323,575 B1 * | 4/2016 | Pho | ......................... | G06F 9/462 |
| 9,356,919 B1 * | 5/2016 | Yakoel | ................... | H04L 63/08 |
| 10,313,431 B2 * | 6/2019 | Seo | ..................... | H04L 67/1097 |
| 10,599,481 B2 * | 3/2020 | Pistol | ...................... | G06F 1/324 |
| 10,678,480 B1 * | 6/2020 | Armangau | ............ | G06F 3/0659 |
| 11,010,251 B1 * | 5/2021 | Soukhman | .......... | G06F 11/1451 |
| 11,055,028 B1 * | 7/2021 | Kamran | .................. | G06F 3/067 |
| 11,106,557 B2 * | 8/2021 | Soukhman | .......... | G06F 11/2221 |
| 11,126,361 B1 * | 9/2021 | Shveidel | ................. | G06F 3/064 |

(Continued)

OTHER PUBLICATIONS

Utrera et al.; "Task Packing: efficient task scheduling in unbalanced parallel programs to maximize CPU utilization"; Journal of Parallel and Distributed Computing; 9, Jul. 2019 (Utrera_2019.pdf; pp. 1-44) (Year: 2019).*

(Continued)

*Primary Examiner* — Hiren P Patel
(74) *Attorney, Agent, or Firm* — Brian J. Colandreo; Mark H. Whittenberger; Holland & Knight LLP (57) ABSTRACT

A method, computer program product, and computing system for monitoring utilization of each central processing unit (CPU) core of a plurality of CPU cores. An average input/output (IO) latency for an operating system thread executing on the CPU core of the plurality of CPU cores may be determined. The operating system thread IO polling cadence for the at least one operating system thread executing on at least one CPU core may be adjusted based upon, at least in part, the utilization of each CPU core of the plurality of CPU cores and the average IO latency for the operating system thread executing on each CPU core of the plurality of CPU cores.

12 Claims, 5 Drawing Sheets

(56) References Cited

U.S. PATENT DOCUMENTS

| | | | |
|---|---|---|---|
| 11,144,461 B2* | 10/2021 | Soukhman | G06F 15/17331 |
| 11,232,010 B2* | 1/2022 | Kamran | G06F 11/3017 |
| 11,249,800 B2* | 2/2022 | Kamran | G06F 9/4881 |
| 2008/0022280 A1* | 1/2008 | Cherkasova | G06F 9/4881 |
| | | | 718/102 |
| 2008/0168235 A1* | 7/2008 | Watson | G06F 9/485 |
| | | | 711/135 |
| 2010/0077185 A1* | 3/2010 | Gopalan | G06F 9/505 |
| | | | 712/E9.016 |
| 2011/0202926 A1* | 8/2011 | Chambliss | G06F 9/5038 |
| | | | 718/104 |
| 2012/0143992 A1* | 6/2012 | Salamatov | G06F 9/5027 |
| | | | 709/219 |
| 2013/0024868 A1* | 1/2013 | Jeong | G06F 9/505 |
| | | | 718/104 |
| 2013/0191541 A1* | 7/2013 | Kishan | G06F 9/5011 |
| | | | 709/226 |
| 2013/0339322 A1* | 12/2013 | Amit | H04L 47/70 |
| | | | 707/693 |
| 2013/0339635 A1* | 12/2013 | Amit | G06F 3/067 |
| | | | 711/E12.001 |
| 2014/0259018 A1* | 9/2014 | Jain | G06F 9/4881 |
| | | | 718/102 |
| 2015/0121396 A1* | 4/2015 | Martinez Canedo | |
| | | | G06F 9/4881 |
| | | | 718/105 |
| 2015/0234640 A1* | 8/2015 | Tian | G06F 13/24 |
| | | | 717/149 |
| 2015/0254108 A1* | 9/2015 | Kurtzman | G06F 9/5016 |
| | | | 718/104 |
| 2016/0139825 A1* | 5/2016 | Amit | G06F 3/067 |
| | | | 711/170 |
| 2016/0246742 A1* | 8/2016 | Kimmel | G06F 3/0683 |
| 2017/0109204 A1* | 4/2017 | Feng | G06F 9/5083 |
| 2017/0171302 A1* | 6/2017 | Seo | H04L 67/1001 |
| 2017/0286168 A1* | 10/2017 | Simpson | G06F 9/505 |
| 2018/0359521 A1* | 12/2018 | Colombo | H04L 67/06 |
| 2019/0171451 A1* | 6/2019 | Hardy | G06F 11/3433 |
| 2019/0258514 A1* | 8/2019 | Miao | G06F 9/3855 |
| 2020/0233705 A1* | 7/2020 | Alkalay | G06F 3/0683 |
| 2020/0249867 A1* | 8/2020 | Bono | G06F 3/0683 |
| 2020/0366575 A1* | 11/2020 | Rajendran | H04L 41/044 |
| 2021/0117240 A1* | 4/2021 | Creed | G06F 9/5027 |
| 2021/0124609 A1* | 4/2021 | Kamran | G06F 9/485 |
| 2021/0157635 A1* | 5/2021 | Rinaldi | G06F 9/524 |
| 2021/0224177 A1* | 7/2021 | Kamran | G06F 11/3006 |
| 2021/0349762 A1* | 11/2021 | Kamran | G06F 11/3024 |
| 2021/0357205 A1* | 11/2021 | Ashirvad | G06F 9/54 |
| 2022/0092008 A1* | 3/2022 | Kamran | G06F 16/16 |
| 2022/0138117 A1* | 5/2022 | Kachmar | G06F 9/505 |
| | | | 710/5 |

OTHER PUBLICATIONS

Enberg et al; "The Impactof Thread-Per-Core Architecture on Application Tail Latency"; ACM/IEEE 2019; (Enberg_2019.pdf; pp. 1-8) (Year: 2019).*

DeVuyst et al.; Exploiting Unbalanced Thread Scheduling for Energy and Performance on a CMP of SMT Processors; IEEE 2006; (Devuyst_2006.pdf; pp. 1-10) (Year: 2006).*

* cited by examiner

SYSTEM AND METHOD FOR SHARING CENTRAL PROCESSING UNIT (CPU) RESOURCES WITH UNBALANCED APPLICATIONS

BACKGROUND

Storing and safeguarding electronic content may be beneficial in modern business and elsewhere. Accordingly, various methodologies may be employed to protect and distribute such electronic content.

Several applications (e.g., block applications, file applications, etc.) may share a central processing unit (CPU). In scenarios where a file application is not CPU-balanced (i.e. it runs only on a subset of the CPU cores), it may cause performance problems, such as too high a latency for block application input/out (IO) requests that are handled on these CPU cores, degrading the average IO latency and the tail IO latency of the storage system. In some scenarios, it may limit the CPU utilization by the file application, even when there are plenty of available CPU cycles.

SUMMARY OF DISCLOSURE

In one example implementation, a computer-implemented method executed on a computing device may include, but is not limited to, monitoring utilization of each central processing unit (CPU) core of a plurality of CPU cores. An average input/output (IO) latency for an operating system thread executing on the CPU core of the plurality of CPU cores may be determined. The operating system thread IO polling cadence for the at least one operating system thread executing on at least one CPU core may be adjusted based upon, at least in part, the utilization of each CPU core of the plurality of CPU cores and the average IO latency for the operating system thread executing on each CPU core of the plurality of CPU cores.

One or more of the following example features may be included. Adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores may include determining whether the average IO latency for the operating system thread executing on the at least one CPU core is greater than average IO latencies of other CPU cores of the plurality of CPU cores by more than a predefined IO latency threshold. Monitoring utilization of each CPU core of a plurality of CPU cores may include monitoring a block application utilization and monitoring a file application utilization. Adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores may include determining whether an average block application utilization of the plurality of CPU cores is less than a first predefined block application utilization threshold. Adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores may include decreasing the operating system thread IO polling cadence for the at least one operating system thread executing on the at least one CPU core in response to determining that the average IO latency for the operating system thread executing on the CPU core is greater than the average IO latencies of the other CPU cores of the plurality of CPU cores by more than a predefined IO latency threshold and that the average block application utilization of the plurality of CPU cores is less than the predefined block application utilization threshold.

In another example implementation, a computer program product resides on a computer readable medium that has a plurality of instructions stored on it. When executed by a processor, the instructions cause the processor to perform operations that may include, but are not limited to, monitoring utilization of each central processing unit (CPU) core of a plurality of CPU cores. An average input/output (IO) latency for an operating system thread executing on the CPU core of the plurality of CPU cores may be determined. The operating system thread IO polling cadence for the at least one operating system thread executing on at least one CPU core may be adjusted based upon, at least in part, the utilization of each CPU core of the plurality of CPU cores and the average IO latency for the operating system thread executing on each CPU core of the plurality of CPU cores.

One or more of the following example features may be included. Adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores may include determining whether the average IO latency for the operating system thread executing on the at least one CPU core is greater than average IO latencies of other CPU cores of the plurality of CPU cores by more than a predefined IO latency threshold. Monitoring utilization of each CPU core of a plurality of CPU cores may include monitoring a block application utilization and monitoring a file application utilization. Adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores may include determining whether an average block application utilization of the plurality of CPU cores is less than a first predefined block application utilization threshold. Adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores may include decreasing the operating system thread IO polling cadence for the at least one operating system thread executing on the at least one CPU core in response to determining that the average IO latency for the operating system thread executing on the CPU core is greater than the average IO latencies of the other CPU cores of the plurality of CPU cores by more than a predefined IO latency threshold and that the average block application utilization of the plurality of CPU cores is less than the predefined block application utilization threshold.

In another example implementation, a computing system includes at least one processor and at least one memory architecture coupled with the at least one processor, wherein the at least one processor is configured to monitor utilization of each central processing unit (CPU) core of a plurality of CPU cores. The at least one processor may be further configured to determine an average input/output (IO) latency for an operating system thread executing on each CPU core of the plurality of CPU cores. The at least one processor may be further configured to adjust an operating system thread IO polling cadence for at least one operating system thread executing on at least one CPU core based upon, at least in part, the utilization of each CPU core of the plurality of CPU cores and the average IO latency for the operating system thread executing on each CPU core of the plurality of CPU cores.

One or more of the following example features may be included. Adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores may include determining whether the average IO latency for the operating system thread executing on the at least one CPU core is greater than average IO latencies of other CPU cores of the plurality of CPU cores by more than a predefined IO latency threshold. Monitoring utilization of each CPU core of a plurality of CPU cores may include monitoring a block application utilization and monitoring a file application utilization. Adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores may include determining whether an average block application utilization of the plurality of CPU cores is less than a first predefined block application utilization threshold. Adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores may include decreasing the operating system thread IO polling cadence for the at least one operating system thread executing on the at least one CPU core in response to determining that the average IO latency for the operating system thread executing on the CPU core is greater than the average IO latencies of the other CPU cores of the plurality of CPU cores by more than a predefined IO latency threshold and that the average block application utilization of the plurality of CPU cores is less than the predefined block application utilization threshold.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
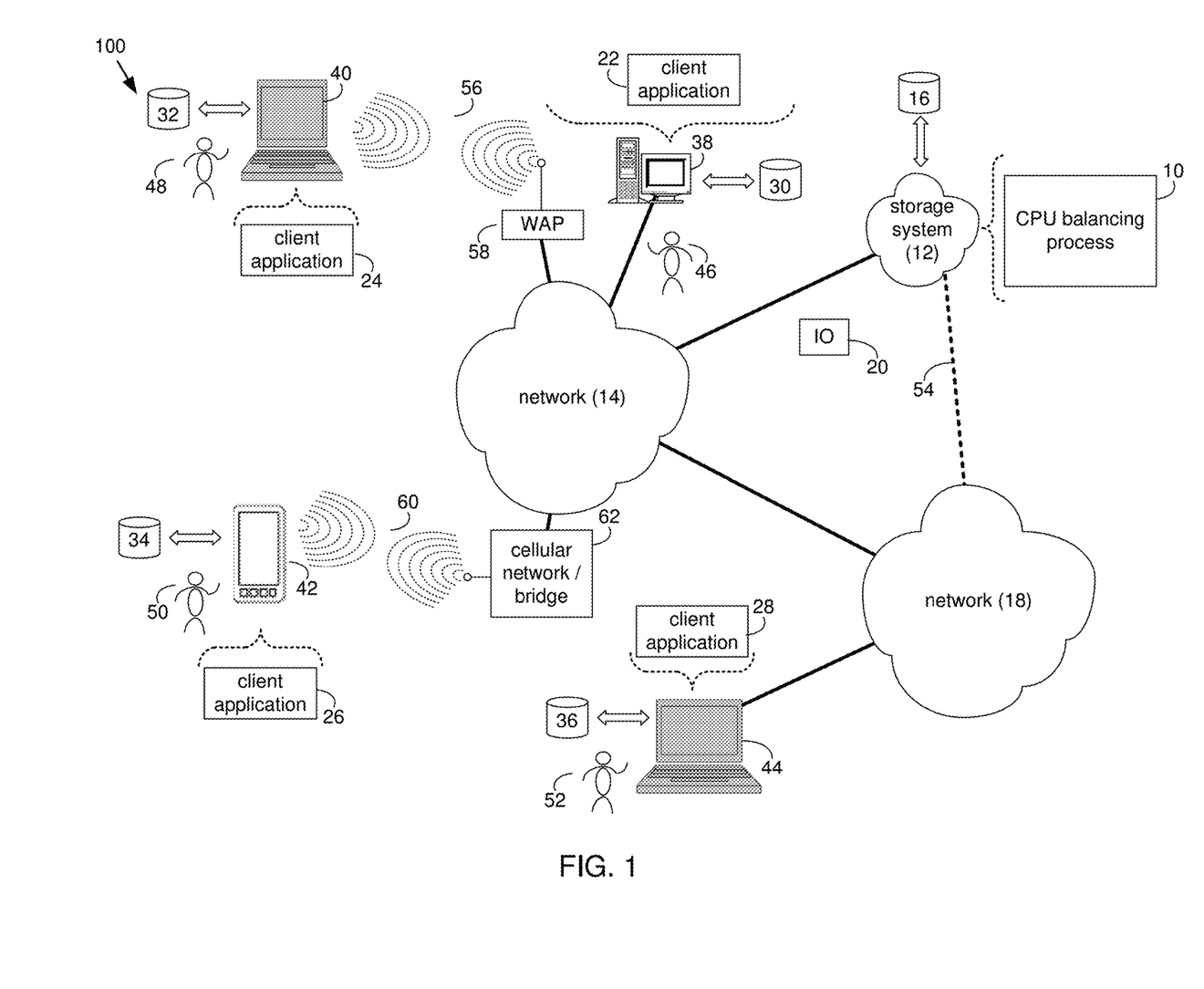
FIG. 1 is an example diagrammatic view of a storage system and a CPU balancing process coupled to a distributed computing network according to one or more example implementations of the disclosure.

System Overview:

Referring to FIG. 1, there is shown CPU balancing process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of CPU balancing process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of CPU balancing process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a CPU balancing process, such as CPU balancing process 10 of FIG. 1, may include but is not limited to, monitoring utilization of each central processing unit (CPU) core of a plurality of CPU cores. An average input/output (IO) latency for an operating system thread executing on the CPU core of the plurality of CPU cores may be determined. An operating system thread IO polling cadence for the at least one operating system thread executing on at least one CPU core may be adjusted based upon, at least in part, the utilization of each CPU core of the plurality of CPU cores and the average IO latency for the operating system thread executing on each CPU core of the plurality of CPU cores.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
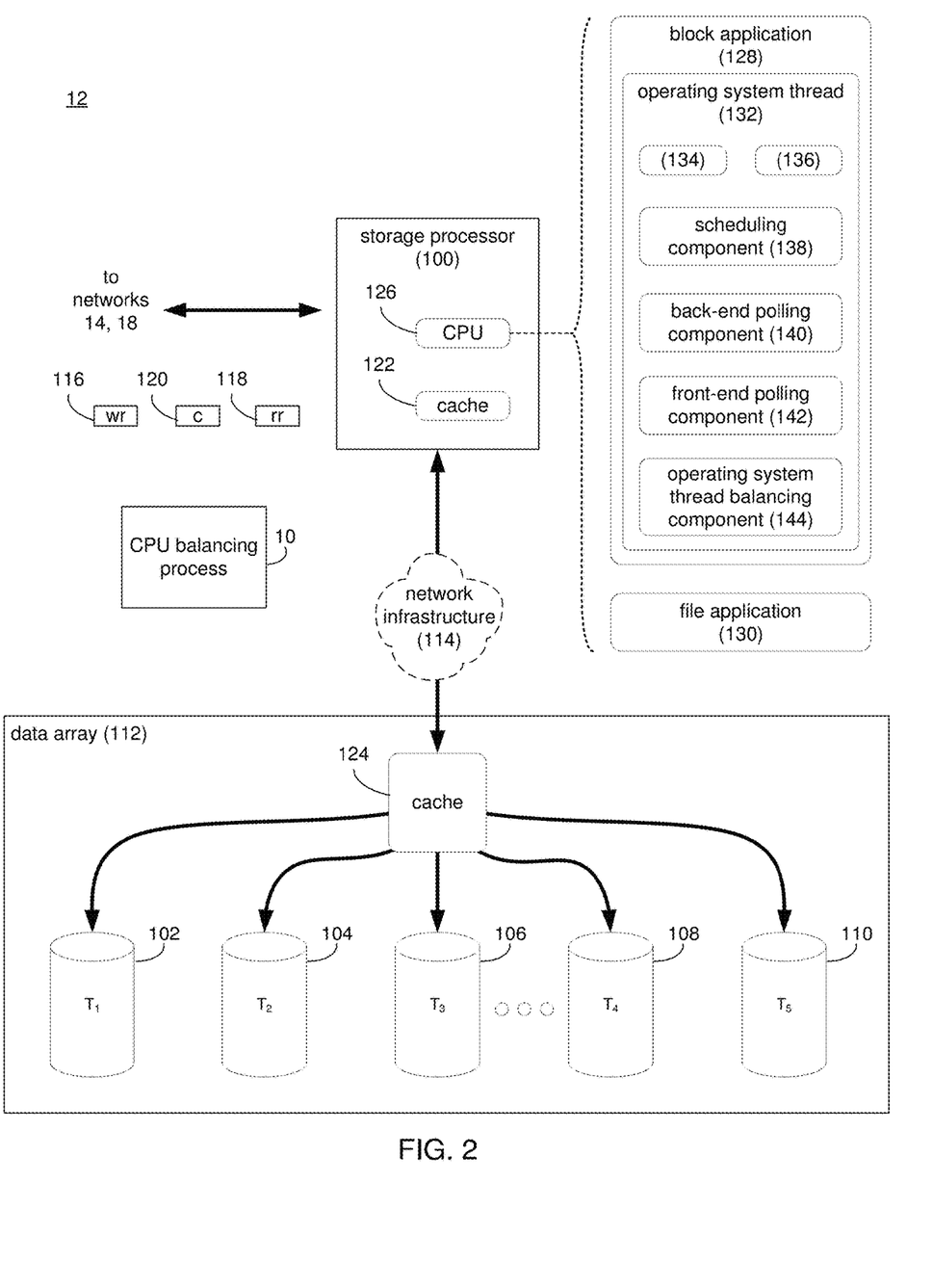
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of CPU balancing process 10. The instruction sets and subroutines of CPU balancing process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of CPU balancing process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of CPU balancing process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of CPU balancing process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage processor 100 may include one or more central processing units (CPUs) (e.g., CPU 126). In some implementations, the one or more CPUs may include a multicore CPU. As is known in the art, a multicore CPU may be configured to execute multiple threads or processes concurrently on each core. However, it will be appreciated that CPU 126 may not be a multicore CPU within the scope of the present disclosure. In some implementations, CPU 126 may execute one or more applications (e.g., block application 128 and file application 130). A block application (e.g., block application 128) may generally execute a single operating system thread per CPU core of a multicore CPU (e.g., CPU 126), which may implement block functionality on data array 112.

In some implementations, block application 128 may run on top of a Preemptive Operating System (OS). As is known in the art, a Preemptive OS generally allows the operating system to preempt (i.e. stop) a running operating system thread without the operating system thread's cooperation, and execute something else, for example another operating system thread. An operating system thread may generally include multiple sub-threads as lightweight implementations of an operating system thread. For example, block application 128 may include an operating system thread (e.g., operating system thread 132) with a plurality of sub-threads (e.g., sub-threads 134, 136). While an example of e.g., one operating system thread with e.g., two sub-threads has been described above, it will be appreciated that any number of operating system threads and sub-threads for each operating system thread may be used within the scope of the present disclosure. In some implementations, a file application (e.g., file application 130) may generally organize data as a single piece of information inside a folder within data array 112. When data from a particular folder or file needs to be accessed, storage processor 100 requires a path to locate the data within data array 112.

In some implementations, each operating system thread (e.g., operating system thread 132) may implement a scheduling component (e.g., scheduling component 138) configured to schedule the execution of the plurality of sub-threads (e.g., sub-threads 134, 136). In some implementations, each operating system thread (e.g., operating system thread 132) may be configured to poll (e.g., via a back-end polling component 140) its interfaces for new events (e.g., polling for completions of submitted IO requests to data array 112) and polls (e.g., via a front-end polling component 142) for new IO requests from the user (e.g., client devices 38, 40, 42, 44). Accordingly, each operating system thread may fully utilize the CPU or CPU core it's running on, because even when there's no actual work, the operating system thread may continuously check its interfaces. In some implementations, this always-polling design may be optimized for a storage system that requires low latency and high IOPS (I/O per second) as there are no context switches and no interrupts involved.

In some implementations, storage system 12 may process background operations which may run during the processing of IO requests from a user, but also when no IO requests are present. In some implementations, background operations may include compression, de-duplication, meta-data defragmentation, calculation of RAID protection from media failures, etc. Furthermore, storage system 12 may defer some background processing to be executed when there is less IO load from the user, to serve IO requests more quickly, thus reducing the latency and improving the storage system performance. In some implementations, background operations may be a fundamental part of storage system 12. For example, suppose storage system 12 includes a log-structured file system (LFS) that performs defragmentation and garbage collection on metadata. Accordingly, the ability to multitask background IO requests may contribute to the efficient operation of storage system 12.

As discussed above, suppose storage system is required to run another application, for example a file application (e.g., file application 130). Storage system use patterns may dynamically change over time (i.e. the user of the system can use only the block application for some time and then use only the file application, and it can also use both of them simultaneously, each with a different load that can also change. Therefore, storage system 12 may be required to dynamically adapt to the user operation pattern of the two applications to support dynamic load balancing. As will be discussed in greater detail below, CPU balancing process 10 may allow storage system 12 to dynamically multitask CPU operations for sub-threads (e.g., sub-threads 134, 136) of an operating system thread (e.g., operating system thread 132) of a block application (e.g., block application 128) and other non-block applications (e.g., file application 130).

In some implementations, operating system threads (e.g., operating system thread 132) may utilize a priority system (e.g. priorities of the Real-Time scheduler in Linux®) of the scheduling component (e.g., scheduling component 138) in order to share the CPU cycles or CPU resources between a block application (e.g., block application 128) and a file application (e.g., file application 130).

In some implementations, operating system threads (e.g., operating system thread 132) may lower an execution priority of the operating system thread below the execution priority of a non-block application (e.g., filed application 130) for a defined period of time.

After the defined period of time has passed, another operating system thread (running on a different CPU core) may increase an execution priority of the operating system thread above the execution priority of a non-block application (e.g., filed application 130).

The CPU Balancing Process:

Referring also to FIGS. 3-7 and in some implementations, CPU balancing process 10 may monitor 300 utilization of each central processing unit (CPU) core of a plurality of CPU cores. An average input/output (10) latency for an operating system thread executing on the CPU core of the plurality of CPU cores may be determined 302. An operating system thread IO polling cadence for the at least one operating system thread executing on at least one CPU core may be adjusted 304 based upon, at least in part, the utilization of each CPU core of the plurality of CPU cores and the average IO latency for the operating system thread executing on each CPU core of the plurality of CPU cores.

Figure 3:
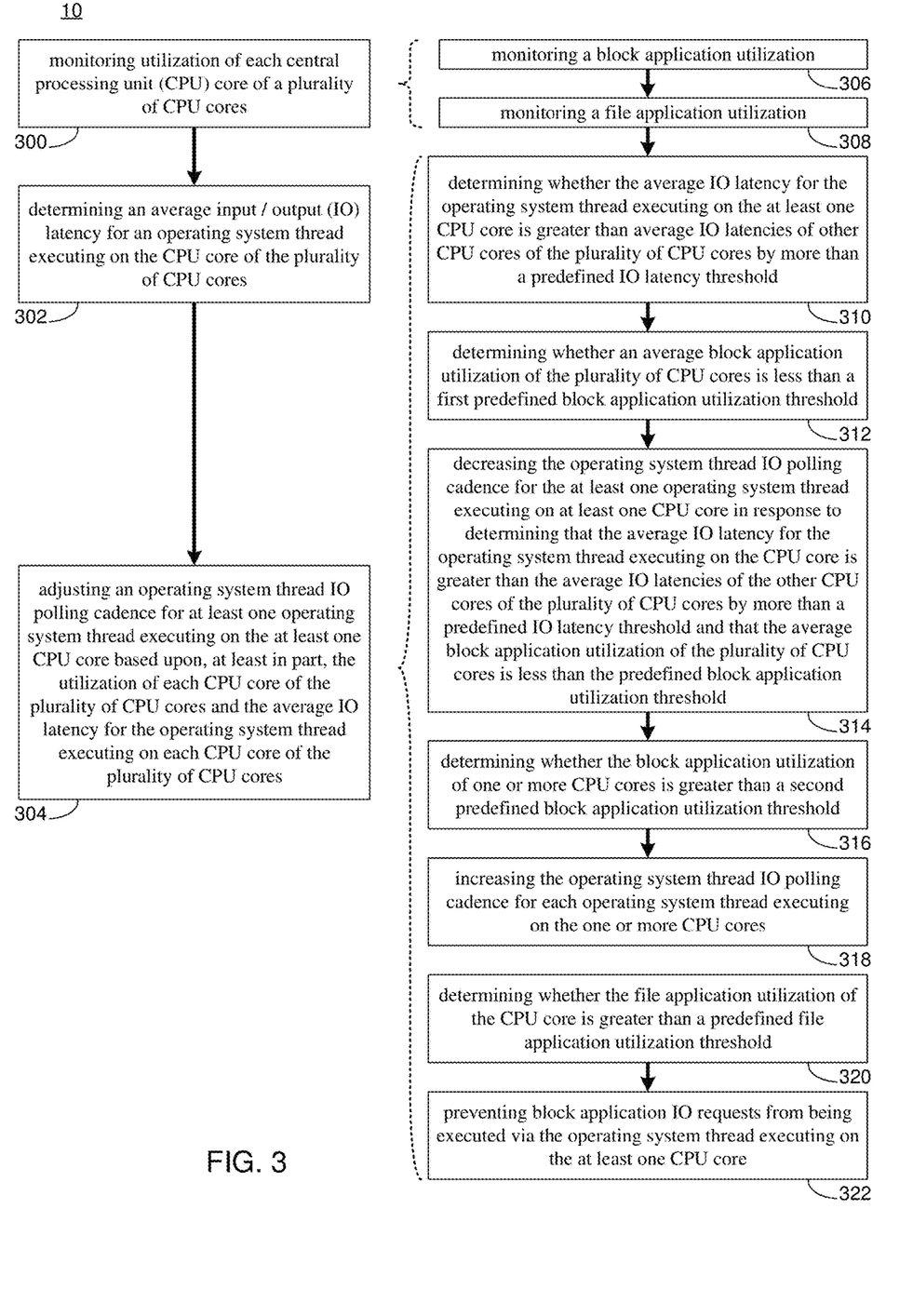
FIG. 3 is an example flowchart of CPU balancing process according to one or more example implementations of the disclosure.

As will be discussed in greater detail below, implementations of the present disclosure may allow operating system threads to monitor the utilization of all CPU cores in order to improve the performance of both block applications and other applications (e.g., file applications). In some implementations, the monitored information may be shared between all operating system threads and may be used to adjust the load on at least one operating system thread, by modifying the cadence of at least one operating system thread IO polling, which is configured to poll new IO requests to be processed by the operating system thread.

In conventional approaches, each operating system thread may operate independently, where each operating system thread divides only the CPU cycles of its own CPU core between block applications and other applications, without any information about the other operating system threads of other CPU cores. However, while the processing of IO requests via operating system threads of the block application may generally be symmetric such that a block application IO load is balanced between them, the processing of IO request for other applications (e.g. file applications) may not. In some implementations, this may result in other applications running only on a subset of CPU cores, and therefore only the corresponding operating system threads of the block application may be affected. In this case, those operating system threads may utilize significantly less CPU cycles of a CPU core than the other operating system threads executed on the other CPU cores, breaking the balance between the operating system threads across the plurality of CPU cores. As a result, IO requests that are handled by those operating system threads may have a much longer latency.

For example, consider a storage system with e.g., 20 CPU cores and corresponding 20 operating system threads and a file application that is running on only a single CPU core, and taking 90% CPU utilization of that CPU core. In that case, most IO requests of the block application may have an excellent (short) latency, while the tail latency (e.g. the latency of 5% of IO requests) will get a very poor (long) latency. Consider another example, in which the file application is using only one CPU core, while the block application is using 50% of each CPU core. In this scenario, the file application may be blocked over 50% of the time, limiting its performance, even though there are plenty of free CPU cycles in the storage system on other CPU cores. As will be discussed in greater detail below and in some implementations, CPU balancing process 10 may address the above-noted challenges of conventional approaches by taking into account the utilization of all CPU cores in order to improve the performance of both block applications and file applications.

In some implementations, CPU balancing process 10 may monitor 300 utilization of each central processing unit (CPU) core of a plurality of CPU cores. In some implementations, CPU balancing process 10 may monitor 300 utilization of each CPU core via an operating system thread balancing component (e.g., operating system thread balancing component 144) for each operating system thread. In some implementations, an operating system thread balancing component (e.g., operating system thread balancing component 144) may collect information about the operating system thread operations of a particular CPU core. In some implementations, once a CPU core begins sharing CPU cycles (e.g., sharing CPU core utilization between file applications and block applications), a CPU sharing component may monitor the overall information collected by the operating system thread balancing component (e.g., operating system thread balancing component 144) of all operating system threads. The collected information gathered by the operating system thread balancing component (e.g., operating system thread balancing component 144) may be shared between all operating system threads, and, as will be discussed in greater detail below, may be used to adjust the load on the operating system threads.

In some implementations, monitoring 300 utilization of each CPU core of a plurality of CPU cores may include monitoring 306 block application utilization and monitoring 308 file application utilization. In some implementations, the operating system thread balancing component (e.g., operating system thread balancing component 144) may monitor 300, the current CPU core utilization percentage attributed to processing IO requests for block applications (e.g., block application 128), the current CPU core utilization percentage attributed to processing IO requests for file applications (e.g., file application 130), and the amount of CPU core utilization not attributed to processing IO requests (i.e., when the CPU core is not processing any IO requests).

Figure 4:
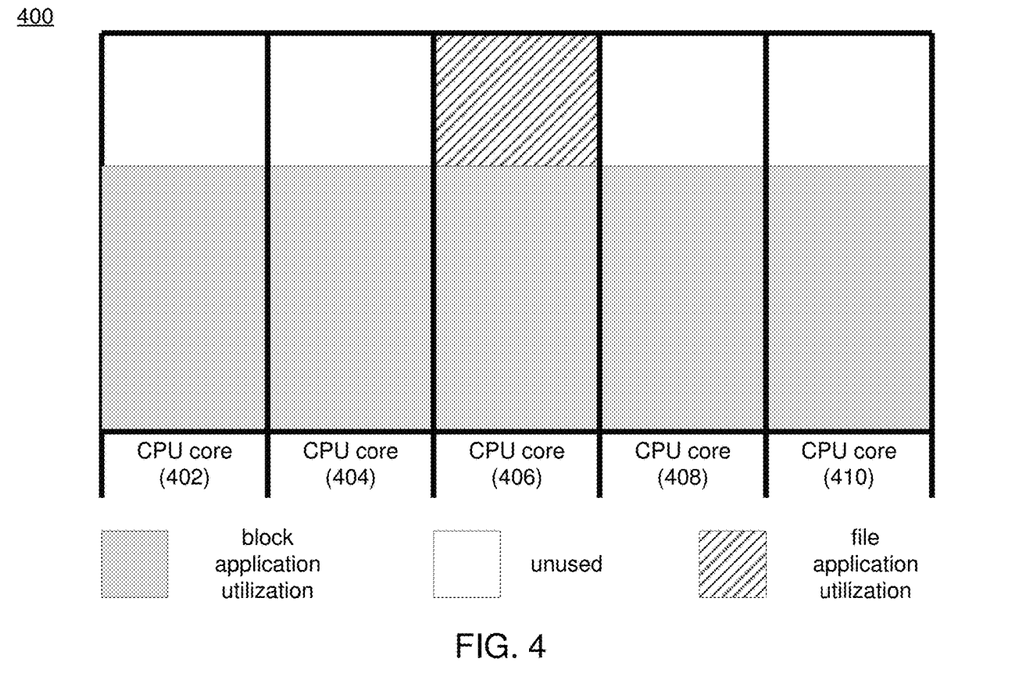
FIGS. 4-7 are example diagrammatic views of the utilization of CPU cores according to one or more example implementations of the disclosure.

Referring also to the example of FIG. 4 and in some implementations, CPU balancing process 10 may monitor 300 utilization of each CPU core of a plurality of CPU cores. In the example of FIG. 4, five CPU cores are shown (e.g., CPU cores 402, 404, 406, 408, 410). However, it will be appreciated that any number of cores may be used within the scope of the present disclosure. In some implementations, CPU balancing process 10 may monitor utilization of each CPU core (e.g., CPU cores 402, 404, 406, 408, 410) for processing IO requests for block applications and for file applications. CPU balancing process 10 may also monitor periods when each CPU core is not utilized (e.g., when CPU core is unused). In the example of FIG. 4, CPU balancing process 10 may monitor 300 the block application utilization of CPU cores 402, 404, 408, and 410 to be e.g., 66.66% (i.e., CPU cores 402, 404, 408, and 410 are processing block application JO requests 66.66% of the time), the file application utilization to be e.g., 0.00% (i.e., CPU cores 402, 404, 408, 410 are processing file application JO requests 0.00% of the time), and that CPU cores 402, 404, 408, 410 are unused 33.33% of the time. CPU balancing process 10 may monitor the block application utilization of CPU core 406 to be e.g., 66.66% (i.e., CPU core 406 is processing block application JO requests 66.66% of the time), the file application utilization to be e.g., 33.33% (i.e., CPU core 406 is processing file application JO requests 33.33% of the time), and that CPU core 406 is unused 0.00% of the time.

In some implementations, CPU balancing process 10 may determine 302 an average input/output (JO) latency for an operating system thread executing on each CPU core of the plurality of CPU cores. Referring again to the example of FIG. 4 and in some implementations, CPU balancing process 10 may determine 302 an average IO latency for IO requests processed on each CPU core (e.g., CPU cores 402, 404, 406, 408, 410). In one example, suppose CPU balancing process 10 determines 302 the average IO latencies for the operating system thread executing on each CPU core as shown below in Table 1.

TABLE 1

| CPU Core # | Core 402 | Core 404 | Core 406 | Core 408 | Core 410 |
|---|---|---|---|---|---|
| Latency | 250 µs | 250 µs | 600 µs | 250 µs | 250 µs |
| Block application IOPS | 5k | 5k | 4k | 5k | 5k |

As shown in Table 1, CPU cores 402, 404, 408, and 410 may have similar average JO latencies (e.g., 250 µs) and similar block application input/output operations per second (IOPS) results (e.g., 5,000 or 5k IOPS) while CPU core 406 may have a higher average JO latency (e.g., 600 µs) and a lower block application IOPS (e.g., 4,000 or 4k IOPS). As discussed above, CPU core 406 may have a higher average JO latency than CPU cores 402, 404, 408, and 410 as CPU core 406 is also processing IO requests for a file application (e.g., file application 130).

In some implementations, CPU balancing process 10 may adjust 304 an operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores. In some implementations, an operating system thread IO polling cadence may generally refer to the rate at which a front-end polling component (e.g., front-end polling component 142) of an operating system thread polls for new block application IO requests. In some implementations, the front-end polling component (e.g., front-end polling component 142) may initially or by default run at its best cadence (i.e. fastest poll). As will be discussed in greater detail below, CPU balancing process 10 may adjust the operating system thread IO polling cadence based upon, at least in part, the utilization of each CPU core and the average IO latency for the operating system thread executing on each CPU core to balance the execution of operating system threads for block application IO requests and the execution of file application IO requests.

In some implementations, adjusting 304 the operating system thread IO polling cadence for the at least one operating system thread executing on at least one CPU core based upon, at least in part, the utilization of each CPU core and the average IO latency for the operating system thread executing on each CPU core may include determining 310 whether the average IO latency for the operating system thread executing on the at least one CPU core is greater than average IO latencies of other CPU cores of the plurality of CPU cores by more than a predefined IO latency threshold. For example, CPU balancing process 10 may determine 310 whether the average IO latency for the operating system thread executing on at least one CPU core is greater than average IO latencies of other CPU cores by more than a predefined IO latency threshold.

Returning to the example of FIG. 4 and the average IO latencies for IO requests determined 302 for the operating system threads executing on CPU cores 402, 404, 406, 408, and 410 (as shown in Table 1), CPU balancing process 10 may determine 310 whether the average IO latency for the operating system thread executing on at least one CPU core is greater than average IO latencies of other CPU cores by more than a predefined IO latency threshold. In some implementations, the predefined IO latency threshold may be user-defined (e.g., via a user interface) and/or may be determined automatically by CPU balancing process 10 (e.g., based on an average IO latency for the operating system threads executing on each CPU core).

Suppose, for example purposes only, that the predefined IO latency threshold is e.g., 50 μs. As shown in Table 1, CPU balancing process 10 may determine that the average IO latency of CPU core 406 is e.g., 600 μs while the average IO latency of the other CPU cores is e.g., 250 μs. Accordingly, in this example, CPU balancing process 10 may determine 310 that the average IO latency for the operating system thread executing on at least one CPU core (e.g., CPU core 406) is greater than average IO latencies of other CPU cores by more than a predefined IO latency threshold (e.g., 600 μs−250 μs=350 μs>50 μs). While an example predefined IO latency threshold of e.g., 50 μs has been described, it will be appreciated that any predefined IO latency threshold may be used within the scope of the present disclosure.

In some implementations, adjusting 304 the operating system thread IO polling cadence for the at least one operating system thread executing on at least one CPU core based upon, at least in part, the utilization of each CPU core and the average IO latency for the operating system thread executing on each CPU core may include determining 312 whether an average block application utilization of the plurality of CPU cores is less than a first predefined block application utilization threshold. For example, CPU balancing process 10 may determine 312 whether an average block application utilization by each of the CPU cores is less than a first predefined block application utilization threshold.

Returning to the example of FIG. 4 and the monitored 300 block application utilizations of CPU cores 402, 404, 406, 408, and 410, CPU balancing process 10 may determine 312 whether an average block application utilization by each of the CPU cores is less than a first predefined block application utilization threshold. In some implementations, the first predefined block application utilization threshold may indicate whether there are sufficient free CPU cycles available in other CPU cores of the plurality of CPU cores for processing block application IO requests from other CPU cores. In some implementations, the first predefined block application utilization threshold may be user-defined (e.g., via a user interface) and/or may be determined automatically by CPU balancing process 10 (e.g., based on an average block application utilization on each CPU core).

Suppose, for example purposes only, that the first predefined block application utilization threshold is e.g., 90.00%. As discussed above, CPU balancing process 10 may monitor 306 the block application utilization of CPU cores 402, 404, 408, and 410 to be e.g., 66.66% and the block application utilization of CPU core 406 to be e.g., 66.66%. Accordingly, in this example, CPU balancing process 10 may determine 312 that the average block application utilization by each of the CPU cores is less than a first predefined block application utilization threshold (e.g., 66.66%<90.00%). While an example first predefined block application utilization threshold of e.g., 90.00% has been described, it will be appreciated that any first predefined block application utilization threshold may be used within the scope of the present disclosure.

In some implementations, adjusting 304 the operating system thread IO polling cadence for the at least one operating system thread executing on at least one CPU core based upon, at least in part, the utilization of each CPU core and the average IO latency for the operating system thread executing on each CPU core may include decreasing 314 the operating system thread IO polling cadence for the at least one operating system thread executing on the at least one CPU core in response to determining that the average IO latency for the operating system thread executing on the CPU core is greater than the average IO latencies of the other CPU cores of the plurality of CPU cores by more than a predefined IO latency threshold and that the average block application utilization of the plurality of CPU cores is less than the predefined block application utilization threshold. Returning to the above example where CPU balancing process 10 determines 310 that the average IO latency for the operating system thread executing on CPU core 406 is greater than average IO latencies of other CPU cores by more than a predefined IO latency threshold (e.g., 600 μs−250 μs=350 μs>50 μs) and where CPU balancing process 10 determines 312 that the average block application utilization by each of the CPU cores is less than a first predefined block application utilization threshold (e.g., 66.66%<90.00%), CPU balancing process 10 may decrease 314 the operating system thread IO polling cadence (e.g., via a front-end polling component) for the at least one operating system thread executing on the at least one CPU core.

In this example, CPU balancing process 10 may decrease 314 the operating system thread IO polling cadence of the front-end polling component (e.g., front-end polling component 142) of the operating system thread (e.g., operating system thread 132) executing on CPU core 406. In some implementations, decreasing 314 the operating system thread IO polling cadence of the front-end polling component may generally cause fewer new block application IO requests from being processed by the operating system thread and instead may allow such CPU cores to process more file application IO requests. In some implementations, decreasing 314 the operating system thread IO polling cadence of the front-end polling component of the operating system thread (e.g., operating system thread 132) executing on at least one CPU core may improve the IO latency of IO requests of the block application by processing new block application IO requests on CPU cores with available utilization (e.g., CPU cores where file application utilization is lower).

Figure 5:
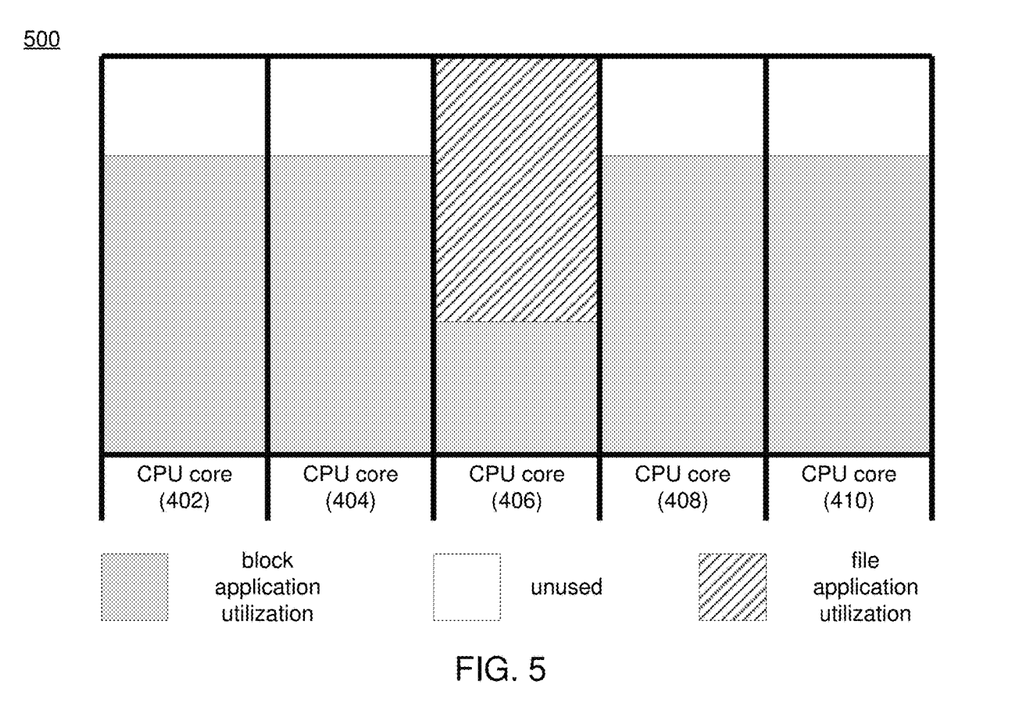

Referring also to the example of FIG. 5 and in some implementations, suppose CPU balancing process 10 decreases 314 the operating system thread IO polling cadence of the front-end polling component of CPU core 406. In the example of FIG. 5, the block application utilization and file application utilization of CPU cores 402, 404, 406, 408, and 410 may change in response to CPU balancing process 10 adjusting 304 the operating system thread IO polling cadence of the front-end polling component of CPU core 406 (e.g., by decreasing 314 the operating system thread IO polling cadence of the operating system thread execution on CPU core 406).

For example, CPU balancing process 10 may monitor 300 the block application utilization of CPU cores 402, 404, 408, and 410 to be e.g., 75.00% (i.e., CPU cores 402, 404, 408, and 410 are processing block application IO requests 75.00% of the time), the file application utilization to be e.g., 0.00% (i.e., CPU cores 402, 404, 408, 410 are processing file application IO requests 0.00% of the time), and that CPU cores 402, 404, 408, 410 are unused 25.00% of the time. CPU balancing process 10 may monitor the block application utilization of CPU core 406 to be e.g., 33.33% (i.e., CPU core 406 is processing block application IO requests 33.33% of the time), the file application utilization to be e.g., 66.66% (i.e., CPU core 406 is processing file application IO requests 66.66% of the time), and that CPU core 406 is unused 0.00% of the time.

In some implementations, the average IO latency of the operating system thread executing on each CPU core may change in response to CPU balancing process 10 adjusting 304 the operating system thread IO polling cadence of the operating system thread executing on CPU core 406 (e.g., by decreasing 314 the operating system thread IO polling cadence of the operating system thread executing on CPU core 406). For example, CPU balancing process 10 may determine 302 an average IO latency for IO requests processed on each CPU core (e.g., CPU cores 402, 404, 406, 408, 410) as shown below in Table 2.

TABLE 2

| CPU Core # | Core 402 | Core 404 | Core 406 | Core 408 | Core 410 |
|---|---|---|---|---|---|
| Latency | 250 µs | 250 µs | 300 µs | 250 µs | 250 µs |
| Block application IOPS | 5.5k | 5.5k | 1k | 5.5k | 5.5k |

As shown above in Table 2, CPU cores 402, 404, 408, and 410 may have similar average IO latencies (e.g., 250 µs) and similar block application input/output operations per second (IOPS) results (e.g., 5,000 or 5k IOPS) as in Table 1 while CPU core 406 may have a reduced average IO latency (e.g., 300 µs) relative to the previous average IO latency as shown in Table 1 (e.g., 600 µs) and a lower block application IOPS (e.g., 1,000 or 1k IOPS) relative to the previous IOPS as shown in Table 1. In this manner, CPU balancing process 10 may improve the IO latency of IO requests of the block application by processing new block application IO requests on CPU cores with available utilization in response to decreasing 314 the operating system thread IO polling cadence of operating system thread executing on CPU core 406. While example average IO latencies and IOPS values have been described above, it will be appreciated that any average IO latencies and IOPS values may be determined 302 by CPU balancing process 10 within the scope of the present disclosure.

In some implementations, adjusting 304 the operating system thread IO polling cadence for the at least one operating system thread executing on at least one CPU core based upon, at least in part, the utilization of each CPU core and the average IO latency for the operating system thread executing on each CPU core may include determining 316 whether the block application utilization of one or more CPU cores is greater than a second predefined block application utilization threshold. In some implementations, the second predefined block application utilization threshold may generally indicate whether one or more CPU cores of the plurality of CPU cores are highly utilized by processing block application IO requests. In some implementations, the second predefined block application utilization threshold may be user-defined (e.g., via a user interface) and/or may be determined automatically by CPU balancing process 10 (e.g., based on an average block application utilization on each CPU core).

Figure 6:
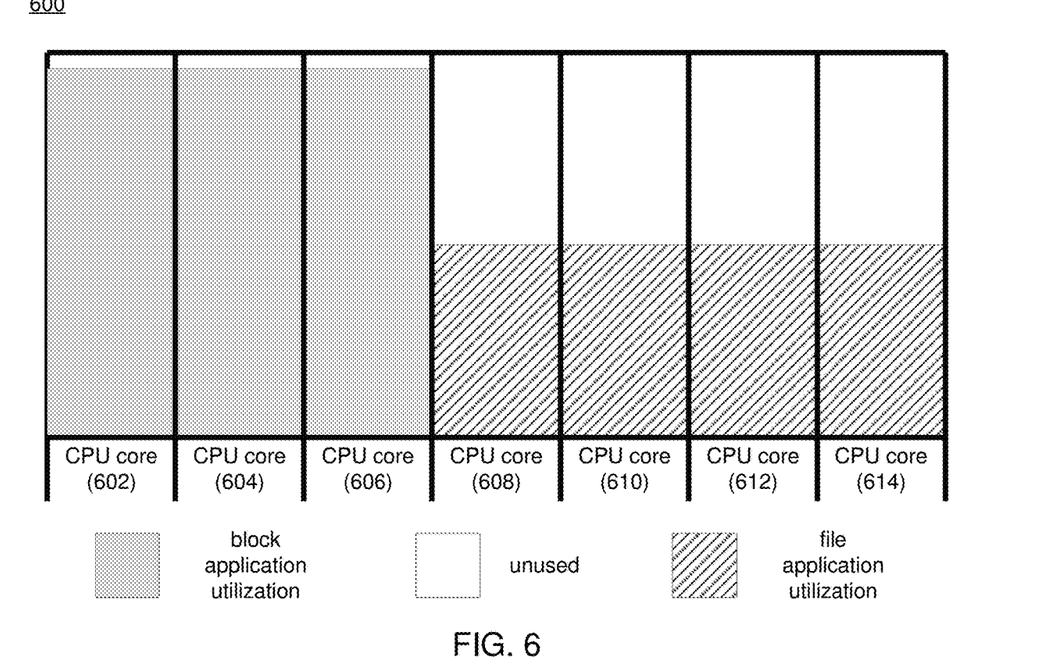

Referring also to the example of FIG. 6 and in some implementations, suppose a CPU has e.g., seven CPU cores (e.g., CPU cores 602, 604, 606, 608, 610, 612, 614). In some implementations and as discussed above, suppose CPU balancing process 10 monitors the block application utilization of CPU cores 602, 604, and 606 to be e.g., 98.00% (i.e., CPU cores 602, 604, and 606 are processing block application IO requests 98.00% of the time), the file application utilization to be e.g., 0.00% (i.e., CPU cores 602, 604, and 606 are processing file application IO requests 0.00% of the time), and that CPU cores 402, 404, 408, 410 are unused 2.00% of the time. Further, suppose CPU balancing process 10 monitors 306 the block application utilization of CPU cores 608, 610, 612, and 614 to be e.g., 0.00% (i.e., CPU cores 608, 610, 612, and 614 are processing block application IO requests 0.00% of the time), the file application utilization to be e.g., 50.00% (i.e., CPU cores 608, 610, 612, and 614 are processing file application IO requests 50.00% of the time), and that CPU cores 608, 610, 612, and 614 are unused 50.00% of the time.

Continuing with the above example of FIG. 6, suppose, for example purposes only, that the second predefined block application utilization threshold is e.g., 95.00%. In this example, CPU balancing process 10 may determine 316 that the block application utilization of one or more CPU cores is greater than a second predefined block application utilization threshold (e.g., the 98.00% block application utilization on CPU cores 602, 604, and 606 is greater than the second predefined block application utilization threshold of 95.00%).

In some implementations and as discussed above, CPU balancing process 10 may determine 302 an average IO latency for block application IO requests processed on each CPU core. Returning to the above example of FIG. 6 and in some implementations, CPU balancing process 10 may determine 302 the average IO latencies and the IOPS rate for block application IO requests processed on each CPU core as shown below in Table 3:

TABLE 3

| CPU Core # | Core 602 | Core 604 | Core 606 |
|---|---|---|---|
| Latency | 400 µs | 400 µs | 400 µs |
| Block application IOPS | 8k | 8k | 8k |

As shown above in Table 3, CPU cores 602, 604, and 606 may have similar average IO latencies (e.g., 400 µs) and similar block application input/output operations per second (IOPS) results (e.g., 8,000 or 8k IOPS) while CPU cores 608, 610, 612, and 614 may not have an average IO latency for block application IO requests as these cores may not process any block application IO requests.

In some implementations, CPU balancing process 10 may increase 318 the operating system thread IO polling cadence for each operating system thread executing on one or more other CPU cores in response to determining 316 that the block application utilization of the one or more CPU cores is greater than the second predefined block application utilization threshold. In some implementations, if CPU balancing process 10 determines 316 that CPU core block utilization on one or more CPU cores is greater than the second predefined block application utilization threshold, CPU balancing process 10 may, via a CPU sharing component, increase 318 the operating system thread IO polling cadence of one or more other CPU cores to increase block application IO request IOPS. For example, when block application utilization increases on one or more CPU cores above the second predefined block application utilization threshold, CPU balancing process 10 may increase 318 the operating system thread IO polling cadence for each operating system thread executing on one or more other CPU cores to increase the IOPS rate for block IO applications.

Figure 7:
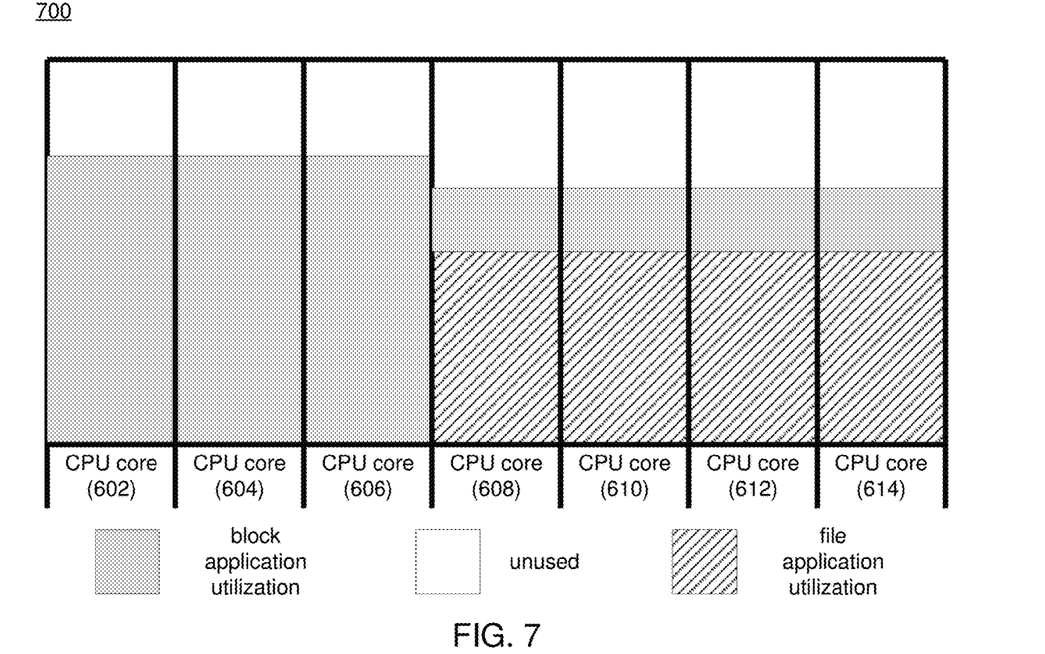

Referring also to the example of FIG. 7 and in some implementations, CPU balancing process 10 may increase 318 the operating system thread IO polling cadence for each operating system thread executing on one or more other CPU cores (e.g., CPU cores 608, 610, 612, 614) in response to determining 316 that the block application utilization of the one or more CPU cores (e.g., CPU core 602, 604, 606) is greater than the second predefined block application utilization threshold. In this example, increasing 318 the operating system thread IO polling cadence for each operating system thread executing on CPU cores 608, 610, 612, and 614 may cause the CPU utilization to change. For example, CPU balancing process 10 may monitor 300 the block application utilization of CPU cores 602, 604, and 606 to be e.g., 75.00% (i.e., CPU cores 602, 604 and 606 are processing block application IO requests 75.00% of the time), and that CPU cores 602, 604, and 606 are unused 25.00% of the time. CPU balancing process 10 may monitor the block application utilization of CPU cores 608, 610, 612, and 614 to be e.g., 17.25% (i.e., CPU cores 608, 610, 612, and 614 are processing block application IO requests 17.25% of the time), the file application utilization to be e.g., 50.00% (i.e., CPU cores 608, 610, 612, and 614 are processing file application IO requests 50.00% of the time), and that CPU cores 608, 610, 612, and 614 are unused 32.75% of the time.

In some implementations, the average IO latency of the operating system thread executing on each CPU core may change in response to CPU balancing process 10 increasing 318 the operating system thread IO polling cadence of the operating system threads executing on CPU cores 608, 610, 612, and 614). For example, CPU balancing process 10 may determine 302 an average IO latency for IO requests processed on each CPU core (e.g., CPU cores 608, 610, 612, and 614) as shown below in Table 4.

zation threshold is e.g., 90.00%. In this example, CPU balancing process 10 may determine 320 that the file application utilization of at least one CPU core is greater than a predefined file application utilization threshold (e.g., the 93.00% file application utilization on CPU core 406 is greater than the predefined file application utilization threshold of 90.00%).

In some implementations, CPU balancing process 10 may prevent 322 at least one new block application IO request from being fetched via the operating system thread executing on the at least one CPU core of the plurality of CPU cores in response to determining that the file application utilization of the CPU core is greater than the predefined file application utilization threshold. Continuing with the above example where CPU balancing process 10 determines 320 that the file application utilization of CPU core 406 is greater than a predefined file application utilization threshold of e.g., 90.00%, CPU balancing process 10 may prevent 322 at least one new block application IO requests from being fetched via the operating system thread executing on CPU core 406.

In some implementations, CPU balancing process 10 may prevent 322 any number of new block application IO requests from being fetched via the operating system thread executing on the at least one CPU core of the plurality of CPU cores. In one example, CPU balancing process 10 may prevent 322 any new block application IO requests from being processed by the operating system thread executing on

TABLE 4

| CPU Core # | Core 602 | Core 604 | Core 606 | Core 608 | Core 610 | Core 612 | Core 614 |
| --- | --- | --- | --- | --- | --- | --- | --- |
| Latency | 400 μs | 400 μs | 400 μs | 800 μs | 800 μs | 800 μs | 800 μs |
| Block application IOPS | 8k | 8k | 8k | 2k | 2k | 2k | 2k |

In some implementations, adjusting 304 the operating system thread IO polling cadence for the at least one operating system thread executing on at least one CPU core based upon, at least in part, the utilization of each CPU core and the average IO latency for the operating system thread executing on each CPU core may include determining 320 whether the file application utilization of the at least one CPU core is greater than a predefined file application utilization threshold. In some implementations, the predefined file application utilization threshold may generally indicate that the file application utilization is sufficiently high for CPU balancing process 10 to cause the block application IO requests of a CPU core with the high file application utilization to be processed by other operating system threads of other CPU cores. In some implementations, the predefined file application utilization threshold may be user-defined (e.g., via a user interface) and/or may be determined automatically by CPU balancing process 10 (e.g., based on an average file application utilization on each CPU core).

Returning to the above example of FIG. 5 and Table 2, suppose CPU balancing process 10 monitors 308 the file application utilization to be e.g., 93.00% (i.e., CPU core 406 is processing file application IO requests 93.00% of the time). Further, suppose the predefined file application utiliat least one CPU core. In some implementations, by preventing any new block application IO requests from being fetched, CPU balancing process 10 may allow the CPU core with high file application utilization to be fully utilized for processing file application IO requests.

In some implementations, CPU balancing process 10 may also determine whether the average IO latency of the at least one CPU core is higher than other CPU cores and whether there is available utilization in the other CPU cores for processing the block application IO requests that would otherwise be processed by the at least one CPU core with high file application utilization. For example and as shown below in Table 5, CPU balancing process 10 may prevent 322 at least one new block application IO request from being fetched via the operating system thread executing on CPU core 406 in response to determining that 1) the file application utilization of CPU core 406 is greater than a predefined file application utilization threshold; 2) the average IO latency of CPU core 406 is higher than CPU cores 402, 404, 408, and 410; and 3) whether there is available utilization in CPU cores 402, 404, 408, and 410 for processing the block application IO requests that would otherwise be fetched by the operating system thread executing on CPU core 406.

TABLE 5

| CPU Core # | Core 402 | Core 404 | Core 406 | Core 408 | Core 410 |
|---|---|---|---|---|---|
| Latency | 250 μs | 250 μs | | 250 μs | 250 μs |
| Block application IOPS | 5.7k | 5.7k | | 5.7k | 5.7k |

As shown above in Table 5, CPU cores 402, 404, 408, and 410 may have similar average IO latencies (e.g., 400 μs) and similar block application input/output operations per second (IOPS) results (e.g., 5,700 or 5.7k IOPS) while CPU core 406 may not have an average IO latency for block application IO requests as these cores may not process any block application IO requests.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    monitoring, via the computing device, utilization of each central processing unit (CPU) core of a plurality of CPU cores, wherein monitoring utilization of each CPU core of a plurality of CPU cores includes: monitoring a block application utilization and monitoring a file application utilization;
    determining an average input/output (IO) latency for an operating system thread executing on each CPU core of the plurality of CPU cores;
    adjusting an operating system thread IO polling cadence for at least one operating system thread executing on at least one CPU core based upon, at least in part, the utilization of each CPU core of the plurality of CPU cores and the average IO latency for the operating system thread executing on each CPU core of the plurality of CPU cores, wherein adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores includes:
    determining whether the average IO latency for the operating system thread executing on the at least one CPU core is greater than average IO latencies of other CPU cores of the plurality of CPU cores by more than a predefined IO latency threshold;
    determining whether the file application utilization of the at least one CPU core is greater than a predefined file application utilization threshold; and
    preventing at least one new block application IO request from being fetched via the operating system thread executing on the at least one CPU core of the plurality of CPU cores in response to determining that the file application utilization of the CPU core is greater than the predefined file application utilization threshold.

2. The computer-implemented method of claim 1, adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores includes:
    determining whether an average block application utilization of the plurality of CPU cores is less than a first predefined block application utilization threshold.

3. The computer-implemented method of claim 2, wherein adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores includes:
    decreasing the operating system thread IO polling cadence for the at least one operating system thread executing on the at least one CPU core in response to determining that the average IO latency for the operating system thread executing on the CPU core is greater than the average IO latencies of the other CPU cores of the plurality of CPU cores by more than a predefined IO latency threshold and that the average block application utilization of the plurality of CPU cores is less than the predefined block application utilization threshold.

4. The computer-implemented method of claim 3, wherein adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores includes:
    determining whether the block application utilization of one or more CPU cores is greater than a second predefined block application utilization threshold; and
    increasing the operating system thread IO polling cadence for each operating system thread executing on one or more other CPU cores in response to determining that the block application utilization of the one or more CPU cores is greater than the second predefined block application utilization threshold.

5. A computer program product residing on a non-transitory computer readable medium having a plurality of instructions stored thereon which, when executed by a processor, cause the processor to perform operations comprising:
    monitoring utilization of each central processing unit (CPU) core of a plurality of CPU cores, wherein monitoring utilization of each CPU core of a plurality of CPU cores includes: monitoring a block application utilization and monitoring a file application utilization;
    determining an average input/output (IO) latency for an operating system thread executing on the CPU core of the plurality of CPU cores;
    adjusting an operating system thread IO polling cadence for at least one operating system thread executing on at least one CPU core based upon, at least in part, the utilization of each CPU core of the plurality of CPU cores and the average IO latency for the operating system thread executing on each CPU core of the plurality of CPU cores, wherein adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores includes:
determining whether the average IO latency for the operating system thread executing on the at least one CPU core is greater than average IO latencies of other CPU cores of the plurality of CPU cores by more than a predefined IO latency threshold;
determining whether the file application utilization of the at least one CPU core is greater than a predefined file application utilization threshold; and
preventing at least one new block application IO request from being fetched via the operating system thread executing on the at least one CPU core of the plurality of CPU cores in response to determining that the file application utilization of the CPU core is greater than the predefined file application utilization threshold.

6. The computer program product of claim 5, wherein adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores includes:
determining whether an average block application utilization of the plurality of CPU cores is less than a first predefined block application utilization threshold.

7. The computer program product of claim 6, wherein adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores includes:
decreasing the operating system thread IO polling cadence for the at least one operating system thread executing on at least one CPU core in response to determining that the average IO latency for the operating system thread executing on the CPU core is greater than the average IO latencies of the other CPU cores of the plurality of CPU cores by more than a predefined IO latency threshold and that the average block application utilization of the plurality of CPU cores is less than the predefined block application utilization threshold.

8. The computer program product of claim 7, wherein adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores includes:
determining whether the block application utilization of one or more CPU cores is greater than a second predefined block application utilization threshold; and
increasing the operating system thread IO polling cadence for each operating system thread executing on one or more other CPU cores in response to determining that the block application utilization of the one or more CPU cores is greater than the second predefined block application utilization threshold.

9. A computing system comprising:
a memory; and
a processor configured to monitor utilization of each central processing unit (CPU) core of a plurality of CPU cores, wherein monitoring utilization of each CPU core of a plurality of CPU cores includes: monitoring a block application utilization and monitoring a file application utilization, wherein the processor is further configured to determine an average input/output (IO) latency for an operating system thread executing on the CPU core of the plurality of CPU cores, and wherein the processor is further configured to adjust an operating system thread IO polling cadence for at least one operating system thread executing on at least one CPU core based upon, at least in part, the utilization of each CPU core of the plurality of CPU cores and the average IO latency for the operating system thread executing on each CPU core of the plurality of CPU cores, wherein adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores includes:
determining whether the average IO latency for the operating system thread executing on the at least one CPU core is greater than average IO latencies of other CPU cores of the plurality of CPU cores by more than a predefined IO latency threshold;
determining whether the file application utilization of the at least one CPU core is greater than a predefined file application utilization threshold; and
preventing at least one new block application IO request from being fetched via the operating system thread executing on the at least one CPU core of the plurality of CPU cores in response to determining that the file application utilization of the CPU core is greater than the predefined file application utilization threshold.

10. The computing system of claim 9, wherein adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores includes:
determining whether an average block application utilization of the plurality of CPU cores is less than a first predefined block application utilization threshold.

11. The computing system of claim 10, wherein adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores includes:
decreasing the operating system thread IO polling cadence for the at least one operating system thread executing on at least one CPU core in response to determining that the average IO latency for the operating system thread executing on the CPU core is greater than the average IO latencies of the other CPU cores of the plurality of CPU cores by more than a predefined IO latency threshold and that the average block application utilization of the plurality of CPU cores is less than the predefined block application utilization threshold.

12. The computing system of claim 11, wherein adjusting the operating system thread IO polling cadence for the at least one operating system thread executing on at least one CPU core based upon, at least in part, the utilization of each CPU core of the plurality of CPU cores and the average IO latency for the operating system thread executing on each CPU core of the plurality of CPU cores includes:
  determining whether the block application utilization of one or more CPU cores is greater than a second predefined block application utilization threshold; and
  increasing the operating system thread IO polling cadence for each operating system thread executing on one or more other CPU cores in response to determining that the block application utilization of the one or more CPU cores is greater than the second predefined block application utilization threshold.

\* \* \* \* \*